United States Patent [19]

Russo

[11] 4,149,152

[45] Apr. 10, 1979

[54] COLOR DISPLAY HAVING SELECTABLE OFF-ON AND BACKGROUND COLOR CONTROL

[75] Inventor: Paul M. Russo, Princeton, N.J.

[73] Assignee: RCA Corporation, New York, N.Y.

[21] Appl. No.: 864,764

[22] Filed: Dec. 27, 1977

[51] Int. Cl.[2] .............................................. G06K 15/20

[52] U.S. Cl. ...................................... 340/703; 340/750

[58] Field of Search ................................. 340/324 AD

[56] References Cited

U.S. PATENT DOCUMENTS

| | | | |
|---|---|---|---|
| 3,603,962 | 9/1971 | Lechner | 340/324 AD |
| 3,624,634 | 11/1971 | Clark | 340/324 AD |
| 3,668,686 | 6/1972 | Strohmeyer | 340/324 AD |
| 3,771,155 | 11/1973 | Hayashi et al. | 340/324 AD |
| 3,811,113 | 5/1974 | Saito et al. | 340/324 AD |
| 3,911,418 | 10/1975 | Takeda | 340/324 AD |
| 4,016,544 | 4/1977 | Morita et al. | 340/324 R |

*Primary Examiner*—David L. Trafton

*Attorney, Agent, or Firm*—H. Christoffersen; Samuel Cohen; Donald W. Phillion

[57] ABSTRACT

Circuit for controlling the color of dot elements in a raster scan display. A data memory stores the state (on or off) of dot elements which are mapped onto the raster scan display. At least one smaller auxiliary memory is provided to store one set of color information specifying the color of a plurality of contiguous dot elements when the dot states have one value and another set of color information specifying the color of the plurality of contiguous dot elements when the dot states have the other value. There is also a selectable background color circuit for controlling the color outside an active display area.

3 Claims, 1 Drawing Figure

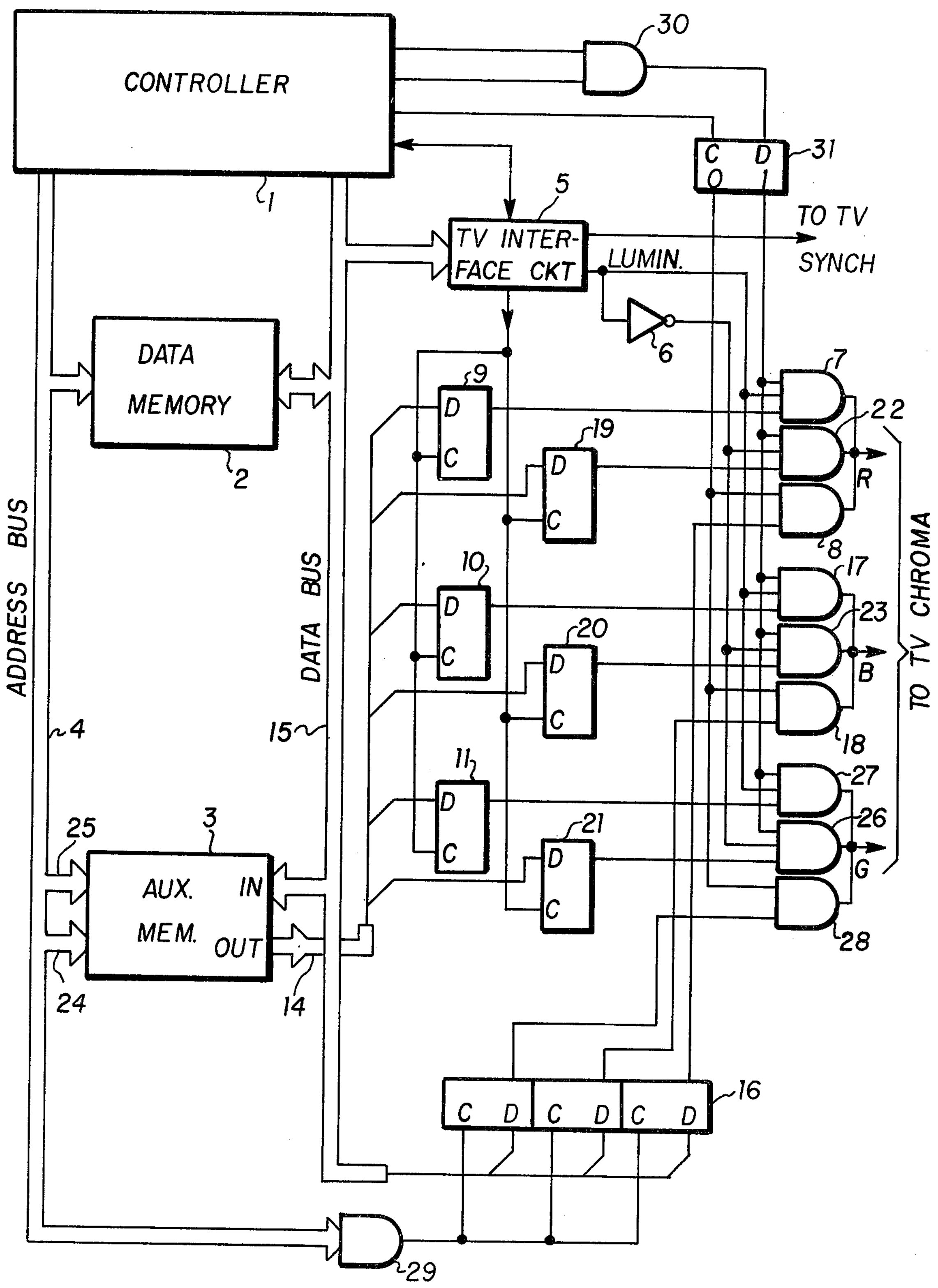
CONTROLLER
1
30
31
C D
0 1
5
TV INTER-FACE CKT
TO TV SYNCH
LUMIN.
6
DATA MEMORY
2
ADDRESS BUS
DATA BUS
4
15
9
D
C
19
10
20
11
21
7
22
R
8
17
23
B
18
27
26
G
28
TO TV CHROMA
25
3
AUX. MEM.
IN
OUT
24
14
16
29

COLOR DISPLAY HAVING SELECTABLE OFF-ON AND BACKGROUND COLOR CONTROL

This application is related to patent application Ser. No. 864,765, by Joseph A. Weisbecker and Philip K. Baltzer entitled "Color Display Using Auxiliary Memory for Color Information," filed on the same date and assigned to the same assignee as this application.

This invention relates to the communication of information in color, particularly on a raster scan display device such as a color television receiver.

The raster of a televisio receiver provides a low-cost display system for microcomputers, minicomputers, and other similar low-cost small control devices when used to display dot elements stored in a data memory. The luminance signal (on or off) is stored in the data memory as a binary variable having a value of 1 or 0 for each dot element of the display. One binary value of stored information indicates a light dot or "on" spot and the other binary value, a dark dot or "off" spot. When color information is to be displayed, the number of bits stored in the memory is tripled because three bits of information are required, one to control each of the red, blue, or green guns of the color display for each dot element displayed. An example of such a system is shown in U.S. Pat. No. 4,016,544.

An alternative to storing three bits of information per dot for a color display is shown in U.S. Pat. No. 3,624,634 (assigned to the same assignee as this application). In this circuit, the information is transmitted for the first dot element of each line in the display and the same color is used for the rest of the line. For purposes of displaying alpha-numeric text where various colors are used for each line of text for emphasis, this system provides satisfactory color control without requiring three bits for every dot element of the display. For other purposes, such as video games and the like, however, this method sometimes is not entirely satisfactory as it does not provide any variation in the color of a line.

A system according to the invention uses an auxiliary memory that stores fewer bits than the data memory storing the luminance information for each dot element to be displayed. Color information can be varied during a line to provide a semblance of complete color control. This permits a high resolution luminance signal with a lower resolution chrominance signal. Experience has indicated that the eye is not capable of resolving small color changes on TV-type color displays so lower chroma resolution is not necessarily a disadvantage and it permits a substantial cost saving in that extra apparatus which would be required to provide high chroma resolution is not needed.

Another advantage of a color display system according to the invention is that it can be used with systems designed for black-and-white display with only minor modifications. Only some extra hardware and the loading of color information are required.

A further advantage is that color information can be changed between display frames to correlate with active information on the display while reducing the bandwidth of the signal below that required for high resolutio chroma.

In a circuit embodying the invention, a system for displaying information in color on a raster scan medium includes controller means for providing control signals, means for supplying in sequence, signals representative of the information to be displayed as an array of on and off dot elements on the raster scan medium, first means responsive to the control signals for supplying first color signals specifying the color of grups of contiguous dot elements forming a subarray when the dots are one, and background select means for supplying alternate color signals. The improvement includes second means responsive to the control signals for supplying second color signals specifying the color of the groups of contiguous dot elements when the dot elements are off, means responsive to the control signals for supplying activating signals indicating an active area is being scanned on the raster scan medium, and gating means responsive to the signals representative of the information to be displayed and to the activating signals for coupling to the raster scan medium the first color signals when the dot elements are on and the second color signals when the dot elements are off and to the absence of the activating signal for coupling to the raster scan medium the alternate color signals.

In the drawing, the FIGURE is a logis diagram of a circuit using a preferred embodiment of the invention.

In the circuit of the FIGURE, a controller 1 is coupled to a data memory 2 and an auxiliary memory 3 via an address bus 4 and a data bus 15. The controller 1 can be implemented as a microprocessor, a minicomputer, or a sequential machine. Its basic purpose is to load the data memory 2 with the luminance information for a color TV display wherein each bit corresponds to a dot element on the display, which display comprises an array of dots arranged in the lines of the raster. The auxiliary memory 3 is loaded with information designating blocks of color to be used in the display. The controller 1 might also provide a sequence of addresses on the address bus 4 that addresses the diaplay data to be transferred to a TV interface circuit 5 from the data memory 2 and to be transferred to six latches 9-11 and 19-21 from the auxiliary memory 3 during the display.

The TV interface circuit 5 accepts a byte (8 bits) of luminance information from the data memory 2 to be shifted out one bit at a time to provide a luminance signal in proper time relatio with standard televisio synchronizing pulses which are also provided. An example of a suitable TV interface circuit is a Video Display Controller (CDP1861 (RCA Corporation). Detailed information on the operation of this circuit with COSMAC-type microprocessors is available in the data sheets supplied by the manufacturer, but for purposes of explanation of the present inventor, it is only necessary to understand that the luminance information is shifted serially from the circuit 5 at the proper time to coincide with its desired position on the TV raster. When used with a black-and-white display, the luminance information is coupled to the video circuit of the display device, i.e., a TV receiver or monitor.

When used with a color display device, such as a color television receiver, the luminance information is not coupled to the display device (televisio receiver), but to a set of gates as described below. The output signals from these gates provide chroma information to the red, blue and green guns of the televisio receiver. These signals can be coupled directly to the color amplifiers for each color gun or these signals can be used to gate oscillatory signals at the color frequency (3.58 MHz), having the proper phase relation for each color, to a mixer that generates composite video. If used to modulate a carrier, the composite video can be coupled to the antenna terminals of the TV receiver being used as the display device.

The sets of gates providing the color information are comprised of three AND gates per color gun. The AND gates 7, 8, and 22 provide the red signals, the AND gates 17, 18, and 23 provide the blue signals, and the AND gates 26, 27, and 28 provide the green signals.

The AND gates 7, 17 and 27 are controlled by the luminance (dot) information from the TV interface circuit 5 and the set output signals from a flip-flop 31. As explained below in more detail, the flip-flop 31 is set during the active time of the display. The other input signals to the AND gates 7, 17 and 27 are the output signals from the flip-flops 9-11, respectively. These flip-flop store the information specifying the color of the display dot elements when the dots are on, i.e., when the luminance information is a binary one (high level) in this example. Similarly, the colors of the dots, when off, are stored in the flip-flops 19-21. The background color information is preset into the three flip-flops comprising the background (inactive) color select circuit 16.

The system shown can display the one and off dots and the background (inactive area) in any of either colors, viz., the eight possible combinationof three colors. The red, blue and green guns in the display are on or off. Adding bits for eah color permits the saturation level of each color to be adjusted. For example, two bits per color provides four levels of each color's saturation. There would then be sixty-four possible color combinations. The circuitry involved would be more complex, requiring two AND gates per color for the dot on, for the dot off, and for the background colors with digital-to-analog converters — which could be implemented by a resistor network — for each set of AND gates. Multi-level color saturation is considered to be a extension of the present invention, involving the same principle of operation, and it is therefore not illustrated separately.

The AND gates for each color are illustrated as wired-OR. In practice, isolation impedances such as resistors might be provided. This also is considered to be a slight modification within the skill of the art.

Before describing in detail the operation of the circuit, the operation and organization of the memories will be described. The data memory 2 is a standard memory having a single data output/input port coupled to the data bus 15 and having addressing means coupled to the address bus 4. The address bus 4 includes the control lines necessary for proper memory operation such as timing signals and signals indicating whether a read or write to the memory is to be performed.

The auxiliary memory 3 is shown as having two address input ports 24 and 25 and two data ports. The data-in port is coupled to the data bus 15 and the data-out port is coupled to a bus 14. Whereas the data terminals of the data memory 2 are bi-directional and coupled to the data bus in the usual way, the data ports of the auxiliary memory 3 are uni-directional. Uni-directional data memories are well known in the art; see, for example, a 256 × 4 random access memory CDP1822 (RCA Corporation). The advantage of using separate data output ports will be clear from the description of the operation below.

Two address ports 24 and 25 are used to permit data to be written into the auxiliary memory 3 at locations designated by one address and to retrieve the same data from the same locations but designated by a different address than that used for writing. The use of a dual address port is not required for an understanding of the invention, but it is convenient for the following reasons. As will be seen below, during the display time, the data memory 2 and the auxiliary memory 3 are addressed by the same set of address bits. Data at the particular locations in each memory, however, is not the same because the data memory contains luminance information for each dot whereas the auxiliary memory contains fewer locations storing color block information. Since difference information is to be written into the memories, the controller 1 must be able to select which memory the data on the data bus 15 is to be stored in, at the location specified by the address on the address bus 4. One way of doing this is to make the auxiliary memory responsive to a different address from that of the data memory when data is to be written. (An alternative method would be to supply control signals that enabled the memory to which the data was to be written.) Essentially, the address port 25 is coupled to an encoder which is enabled by a signal indicating that a memory write is being performed and the address port 24 is coupled internally to a decoder which is enabled when a memory read is performed. The read and write signals are available as part of the address bus as mentioned above. The auxiliary memory 3 is shown as storing six bits per each location, but is could be replaced by two auxiliary memories each of which stored the color information for the dot-on and the dot-off color using three bits, respectively. The color select circuit 16 could also be implemented as a third auxiliary memory which could be loaded separately, but because the background color need not be changed as frequently, it is latched directly from the data bus 15. The controller 1 effects the setting of the flip-flops 16 by addressing a fictitious location, i.e., an address which is not valid for the data memory or the auxiliary memory. This address is decoded by a decoder such as an AND gate 29 during a memory write instruction. During tis time the controller puts on the data bus 15 — for example, on the last three data lines — the background color information which is latched into the background select circuit 16. The loading of the data memory 2 and the auxiliary memory 3 need not be detailed for an understanding of the invention. The important aspect is to note that the data output from the auxiliary memory 3 is independent from the data bus 15.

For purposes of explanation, it is assumed that the data stored in the data memory 2 consists of eight bits (one byte), that the data stored in the auxiliary memory 3 consists of six bits, and that the active display area on the TV raster is an array of dots arranged in 64 rows of 128 dot each. Thus, the data memory 2 must contain 1,024 bytes of data (8,192 bits). The color information will be assumed to be specified for blocks eight dots wide and four dots high. Therefore, the auxiliary memory 3 will require only 256 storage locations. To address 1,024 bytes, then binary address bits are required for the data memory 2 but for 256 color locations in the auxiliary memory 3, only eight bits are required to specify a location. The eight-bit address of the color information in the auxiliary memory 3 must, however, coincide with the proper byte being addressed in the data memory 2 by ten address bits. Designating the ten address bits for the data memory $2^9$-$2^0$, the auxiliary memory 3 is addressed at the output address port 24 by the $2^9$-$2^6$ and $2^3$-$2^0$ bits, i.e., the four most significant and the four least significant bits of the data memory address. Therefore, it is clear that the auxiliary memory address is a proper subset, i.e., a smaller part, of a memory address for the data memory 2. Also, as the memory address to the data memory 2 sequences from all-zeroes to all-ones, the color address will change so that the address in the data memory 2 of each 8 × 4 subarray of the main display array addresses the corresponding color information in the auxiliary memory 3. The volume of the auxiliary memory, however, is only 3/16 the volume of the data memory 2. Other subarrays of color blocks could be designated; for example, a 16 × 8 color block, i.e., 16 dots wide and eight dots high, would lower the color resolutio but reduce the size of auxiliary memory required. Only sixty-four locations would be required in the auxiliary memory 3, each addressed by six bits which, in this case, would be the three most significant and three least significant bits of the data memory address.

It has been shown how an auxiliary memory, substantially smaller than the data memory, can be used to store color information providing a satisfactory color resolution which can be controlled to interact with the luminance data on a color display.

As the addresses on the address bus 4 are sequenced during the display time, the luminace information from the data memory 2 is transferred, in this example, as eight bits in parallel to the TV interface circuit 5 via the data bus 15. The luminance information is accepted in parallel and shifted out serially from the interface 5. At the same time, the color information is read out to the bus 14 and latched in flip-flops 9-11 and 19-21 in response to a control signal from the interface circuit 5.

The luninance information being shifted serially from the output of the interface circuit 5 is coupled to the AND gates 7, 22, 17, 23, 27 and 26. The luminance information is inverted in the inverter 6 and coupled to the AND gates 22, 23 and 26. The AND gates 7, 22, 17, 23, 27 and 26 are coupled to the set output signal from a display flip-flop 31 and the AND gates 8, 18, and 28 are coupled to the reset output signal from the flip-flop. The display flip-flop 31 is set during the time of the active display area on the raster. For a COSMAC-type controller 21, the clock signal to the flip:flop 31 can be TPB, a timing pulse that occurs at the end of each cycle. An AND gate 30 decodes the state code signals to provide the D-input signal to the flip-flop 31 while a DMA cycle is being performed. The DMA cycle is used to generate the display addresses to the data memory 2 and the auxiliary memory 3. The details can be found in the data sheets provided by the manufacturer for the CDP1861 mentioned above. The flip-flops 9-11 and 19-21 provide the color information during the active display time, but with flip-flops 9-11 indicating the dot-on color and the flip-flops 19-21, the dot-off color.

In the background portion. i.e., the color outside the active display area (when the flip-flop 31 is reset) is designated by the contents of the background select circuit 16.

What is claimed is:

1. In a system for displaying information in color on a raster scan medium, the system including controller means for providing control signals, means responsive to said control signals for supplying in sequence, signals representative of the information to be displayed as an array of on and off dot elements on the raster scan medium, first means responsive to said control signals for supplying first color signals specifying the color of goups of contiguous dot elements forming a subarray when said dot elements are on, and background select means for supplying alternate color signals, the improvement comprising:
- second means responsive to said control signals for supplying second color signals specifying the color of the groups of contiguous dot elements when said dot elements are off;
- means responsive to said control signals for supplying activating signals indicating an active area is being scanned on said raster scan medium; and
- gating means responsive to said signals representative of the information to be displayed and to said activating signals for coupling to said raster scan medium said first color signals when said dot elements are on and said second color signals when said dot elements are off and to said absence of said activating signals for coupling to said raster scan medium said alternate color signals.

2. The invention as claimed in claim 1, wherein said background select means includes means for storing said alternate color signals and setting means responsive to said control signals for selectively controlling the signals stored in said means for storing said laternate color signals.

3. The invention as claimed in claim 1, wherein said control signals include addressing signals and wherein said means responsive to said control signals for supplying in sequence signals representative of the information to be displayed comprises first memory means for storing said signal representative of the information to be displayed and wherein said first and second means for supplying said first and second color signals, respectively, comprises second storage means for storing said firs and second color signals.

* * * * *

UNITED STATES PATENT AND TRADEMARK OFFICE
CERTIFICATE OF CORRECTION

PATENT NO. : 4,149,152

DATED : 4/10/79

INVENTOR(S) : Paul Michael Russo

It is certified that error appears in the above-identified patent and that said Letters Patent is hereby corrected as shown below:

Column 2, line 57 "televisio" should be --television--
Column 2, line 3 "grups" should be --groups--
Column 2, line 4 "one" should be --on--
Column 2, line 20 "logis" should be --logic--
Column 2, line 41 "relatio" should be --relation--
Column 2, line 41 "televisio" should be --television--
Column 2, line 57 "televisio" should be --television--
Column 2, line 60 "televisio" should be --television--
Column 3, line 22 "either" should be --eight--
Column 3, line 23 "combinationof" should be --combination of-
Column 3, line 25 "eah" should be --each--
Column 4, lines 8 and 9 "difference" should be --different--
Column 4, line 25 "is" should be --it--
Column 4, line 37 "tis" should be --this--
Column 4, line 56 "then" should be --ten--
Column 5, line 11 "resolutio" should be --resolution--
Column 6, line 39 "laternate" should be --alternate--
Column 6, line 50 "firs" should be --first--

Signed and Sealed this

***Thirteenth* Day of *November 1979***

[SEAL]

*Attest:*

LUTRELLE F. PARKER
*Acting Commissioner of Patents and Trademarks*

RUTH C. MASON
*Attesting Officer*